(12) United States Patent
Herman

(10) Patent No.: US 10,106,089 B2
(45) Date of Patent: Oct. 23, 2018

(54) TRACK ASSISTED SLIDING TRAY CARGO COVER

(71) Applicant: FORD GLOBAL TECHNOLOGIES, LLC, Dearborn, MI (US)

(72) Inventor: Joseph Walter Herman, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/340,471

(22) Filed: Nov. 1, 2016

(65) Prior Publication Data

US 2018/0118118 A1 May 3, 2018

(51) Int. Cl.
*B60R 5/04* (2006.01)
*B60R 7/02* (2006.01)
*B62D 25/08* (2006.01)

(52) U.S. Cl.
CPC .............. *B60R 5/045* (2013.01); *B60R 7/02* (2013.01); *B62D 25/087* (2013.01)

(58) Field of Classification Search
CPC ................................. B60R 5/045; B60R 7/02
USPC ........................................................ 296/37.16
See application file for complete search history.

(56) References Cited

U.S. PATENT DOCUMENTS 7,900,987 B2    3/2011   Seeg

| 2006/0170236 A1* | 8/2006 | Porter, II | B60R 5/04 296/37.16 |
| 2006/0180623 A1* | 8/2006 | Reynolds | B60R 5/04 224/542 |
| 2017/0036609 A1* | 2/2017 | Huebner | B60R 5/045 |

FOREIGN PATENT DOCUMENTS

| DE | 102006009771 A1 | 9/2007 |
| EP | 1876056 A2 | 1/2008 |
| EP | 2048031 A1 | 4/2009 |
| WO | 2006032779 A1 | 3/2006 |
| WO | 2007099215 A2 | 9/2007 |
| WO | 2008110773 A1 | 9/2008 |

OTHER PUBLICATIONS

English Machine Translation of DE102006009771A1.
English Machine Translation of EP1876056A2.
English Machine Translation of WO2006032779A1.
English Machine Translation of WO2007099215A2.

* cited by examiner

*Primary Examiner* — Joseph Pape
(74) *Attorney, Agent, or Firm* — Vichit Chea; King & Schickli, PLLC

(57) ABSTRACT

A vehicle having a cargo area accessible through a lift gate opening frame and partially defined by a floor and side quarter panels is provided. The vehicle includes guide tracks supported by the side quarter panels and a tray movable between a stowed position adjacent the floor and at least one deployed position. First and second pegs extend from opposing sides of the tray and engage the guide tracks. Similarly, first and second retention pins extend from the opposing sides of the tray and engage first and second receivers supported by the side quarter panels in the at least one deployed position. A handle is supported by the tray. A release mechanism may be connected to the retention pins and is used to retract the pins from the receivers.

18 Claims, 7 Drawing Sheets

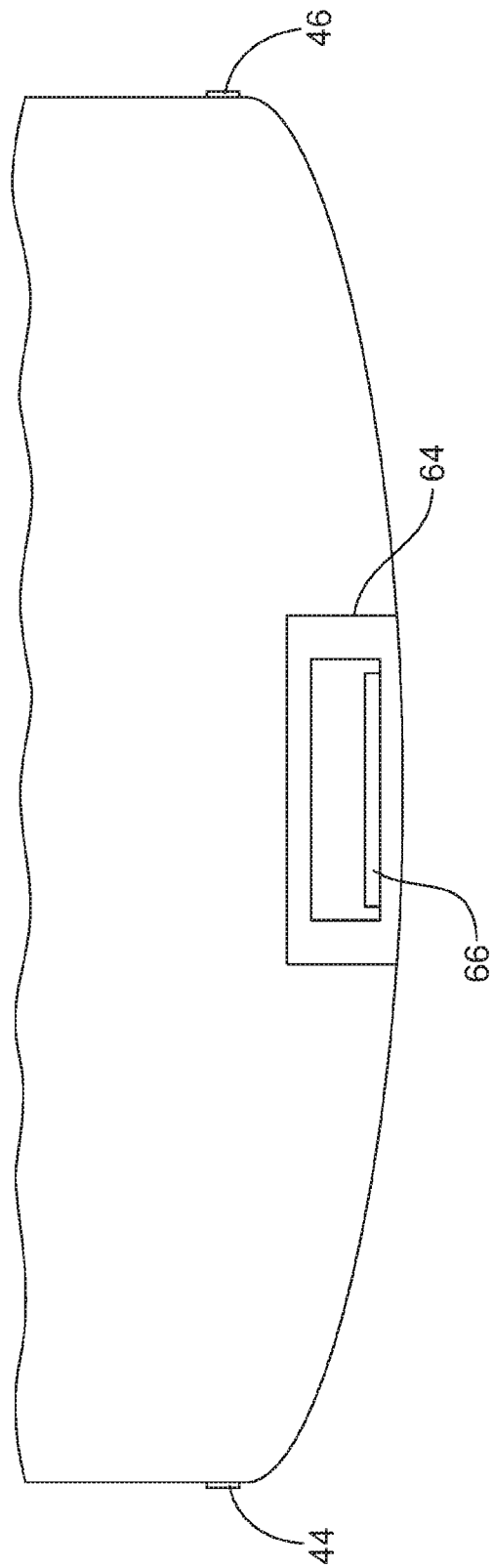

TRACK ASSISTED SLIDING TRAY CARGO COVER

TECHNICAL FIELD

This document relates generally to cargo covers for vehicle cargo areas, and more specifically to a multi-positioned cargo cover.

BACKGROUND

Vehicles such as hatchbacks, vans, sports utility vehicles (SUVs) and station wagons include rear cargo areas and are known to use retractable Tonneau cover style cargo shades. Other vehicles use solid trays in place of the Tonneau cover style cargo shades. When not in use both types of shades are required to be removed from their functional positions entirely to store the shade/tray either within the vehicle, if space is provided, or external to the vehicle. This removal, stowing, and reinstallation process often becomes burdensome and/or an inconvenient for the vehicle owner. Even more, the cargo shades/trays may be misplaced or lost, or stowed loose in the rear cargo area where they can be in the way of unfettered use of the rear cargo area, or damaged when stowed loose and other cargo is loaded into the rear cargo area.

Accordingly, a need exists for a rear cargo area solution that is able to be stowed in the rear cargo area without being removed from its functional position. Such a solution would also allow the tray to be positioned in a stowed position, allowing unfettered use of substantially the entirety of the rear cargo area, or at least one deployed position, in the deployed position, the tray provides coverage of the cargo resting on the floor of the rear cargo area and may provide a second cargo area, i.e., a two-tier rear cargo area.

SUMMARY OF THE INVENTION

In accordance with the purposes and benefits described herein, a vehicle having a cargo area accessible through a lift gate opening frame and partially defined by a floor and side quarter panels is provided. The vehicle may be broadly described as including guide tracks supported by the side quarter panels, a tray movable between a stowed position adjacent the floor and at least one deployed position, first and second pegs extending from opposing sides of the tray and engaging the guide tracks, first and second retention pins extending from the opposing sides of the tray and engaging first and second receivers supported by the side quarter panels in the at least one deployed position, and a handle supported by the tray and connected to the retention pins for retracting the first and second retention pins from the first and second receivers.

In one possible embodiment, the at least one deployed position includes an elevated position and an intermediate position between the elevated position and the stowed position. In another, the tray is substantially horizontal in the elevated position. In still another, the tray is inclined in the intermediate position.

In another possible embodiment, each of the side quarter panels includes a shelf extending into the cargo area and supporting the tray in the elevated position.

In still another possible embodiment, the first and second pegs are roller pegs. In another, the guide tracks are channel shaped and the roller pegs are retained within and in rolling engagement with the guide tracks.

In yet another possible embodiment, each of the side quarter panels includes a shelf extending into the cargo area for supporting the tray in the at least one deployed position.

In still yet another possible embodiment, the first and second receivers are apertures molded in the side quarter panels.

In another possible embodiment, the first and second retention pins are extended when the handle is in a normal position.

In accordance with another possible embodiment, a vehicle includes a cargo area partially defined by a floor, a driver side quarter panel, and a passenger side quarter panel, guide tracks formed in the driver and passenger side quarter panels, a tray movable between a first position and a second position, a first roller extending from a driver side of the tray and engaging the driver side guide track and a second roller extending from a passenger side of the tray and engaging the passenger side guide track, and a shelf extending from each of the driver side quarter panel and the passenger side quarter panel for supporting the tray in the second position.

In another possible embodiment, the first position is adjacent the floor. In yet another, the tray is supported by the floor in the first position.

In still another possible embodiment, the guide tracks formed in the driver and passenger side quarter panels are channel shaped and the first and second rollers are retained within the guide tracks.

In accordance with another possible embodiment, a vehicle having a cargo area partially defined by a floor, a driver side quarter panel, and a passenger side quarter panel includes a first guide track supported by the driver side quarter panel, a second guide track supported by the passenger side quarter panel, a tray movable between a stowed position and at least one deployed position, a first peg extending from a driver side of the tray and engaging the first guide track and a second peg extending from a passenger side of the tray and engaging the second guide track, a first retention pin extending from the driver side of the tray for engaging the driver side quarter panel and a second retention pin extending from the passenger side of the tray for engaging the passenger side quarter panel, and a release mechanism for moving the first and second retention pins from an extended position to a retracted position to allow the tray to move.

In another possible embodiment, the release mechanism includes an actuator and is connected to the first and second retention pins. In still another possible embodiment, the vehicle further includes a handle.

In yet another possible embodiment, the tray has a cavity formed therein, the cavity accessible from an upper side of the tray.

In one other possible embodiment, the first guide track is a channel and the first peg is a roller retained by and in rolling engagement with the first guide track and the second guide track is a channel and the second peg is a roller retained by and in rolling engagement with the second guide track.

In still another possible embodiment, the channel in the first guide track and the channel in the second guide track include a straight portion and an arcuate portion.

In the following description, there are shown and described several embodiments of a vehicle having a tray movable between a stowed position and at least one deployed position in a cargo area. As it should be realized, the systems are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of a vehicle having a tray movable between a stowed position and at least one deployed position in a cargo area and together with the description serve to explain certain principles thereof. In the drawing figures:

FIG. 7 is a partial top plan view of the tray showing the actuator and the retention pins in a retracted position.

Reference will now be made in detail to the present preferred embodiments of the vehicle having a tray movable between a stowed position and at least one deployed position in a cargo area, examples of which are illustrated in the accompanying drawing figures, wherein like numerals are used to represent like elements.

DETAILED DESCRIPTION

Figure 1:
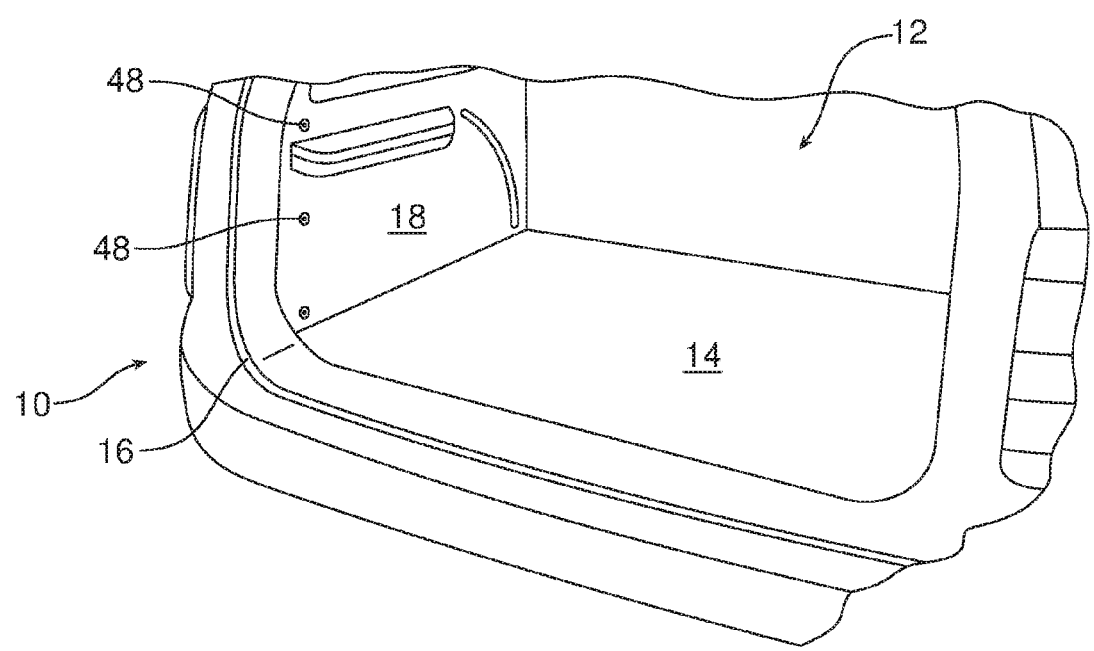
FIG. 1 is a partial perspective view of a typical vehicle having a rear cargo area showing a driver side quarter panel and a guide track.

Reference is now made to FIG. 1 which illustrates a typical vehicle 10 having a rear cargo area 12. In the described embodiment, a floor 14 of the rear cargo area 12 is substantially flush with a rear lift gate opening frame 16 for a rear lift gate (not shown). The floor 14 can be covered with carpet or the like as is known in the art. The rear cargo area 12 is further defined by a driver side quarter panel 18 and a passenger side quarter panel 20.

Figure 2:
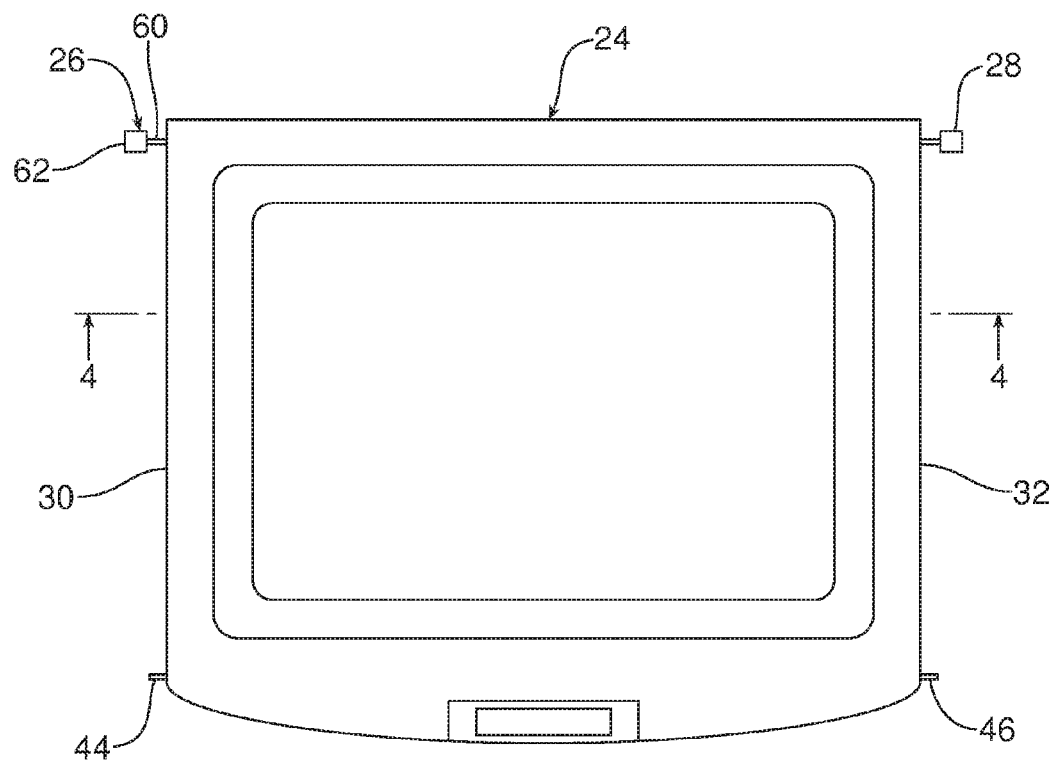
FIG. 2 is a top plan view of a tray.

As shown in FIG. 2, a tray 24 includes pegs 26, 28 extending from opposing sides 30, 32 of the tray 24 for engaging the side quarter panels 18 and 20. More specifically, guide tracks 22 are supported by each of the driver and passenger side quarter panels 18 and 20 for engaging the pegs 26, 28. The tray 24 is generally flat and shaped like the floor 14 of the rear cargo area 12. The tray 24 is designed to cover cargo positioned on the floor 14 of the rear cargo area 12 in a first or a deployed position or to rest adjacent the floor 14 in a second or stowed position.

Figure 3:
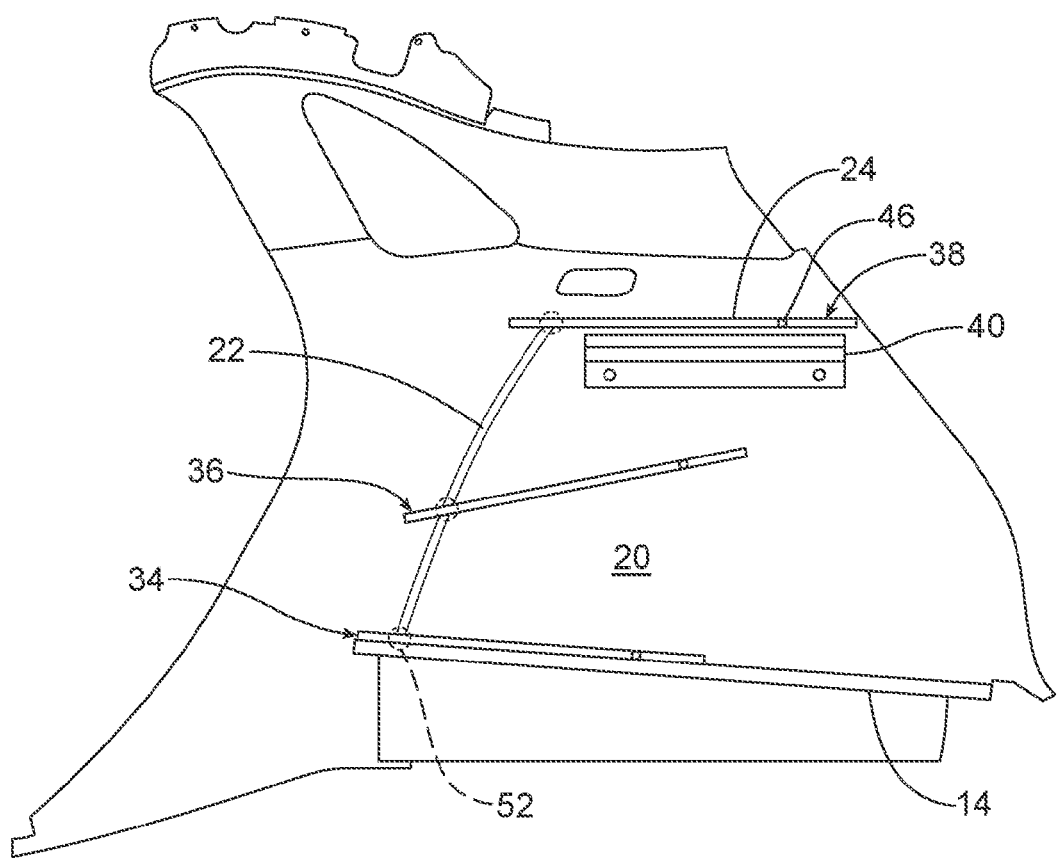
FIG. 3 is a partial side plan view of the rear cargo area of the vehicle showing the tray in a stowed position and multiple deployed positions.

In the described embodiment and as best shown in FIG. 3, the tray 24 is supported by or rests on the floor 14 in the stowed position (designated reference numeral 34). In addition, the tray 24 may be moved to an elevated position (designated reference numeral 38) or an intermediate position 36 between the stowed position 34 and the elevated position 38. In other embodiments, the tray 24 may be moved to additional or fewer deployed positions.

In the elevated position 38, the tray 24 is supported horizontally by shelves 40, 42 extending into the cargo area 12. The tray 24 is also retained in this position by retention pins 44 and 46. As best shown in FIG. 2, the retention pins 44, 46 extend from the opposing sides 30, 32 respectively of the tray 24 and engage receivers 48 supported by the side quarter panels 18, 20. The receivers 48 may be apertures molded into the side quarter panels 18, 20 or may be plastic or metal receivers.

In the intermediate position 36, the tray 24 is supported by the retention pins 44, 46 in an inclined position allowing improved access to the cargo in the rear cargo area 12. Additional shelves may be added to support the tray in the intermediate position in an alternate embodiment. Even more alternate embodiments may maintain the tray 24 in horizontal, inclined, and/or declined positions in each of the deployed positions, and the tray may be tethered to the liftgate.

Figure 4:
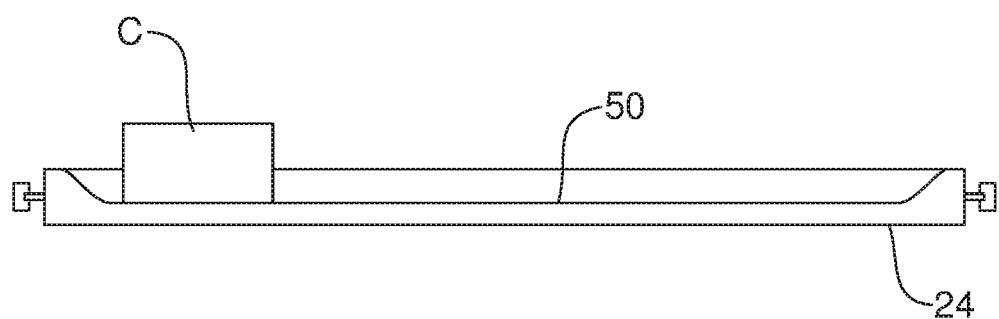
FIG. 4 is a cross-section view of the tray.

As shown in FIG. 4, the tray 24 includes a cavity 50 formed in an upper portion thereof. The cavity 50 is shaped to support additional cargo C in a multi-tiered arrangement in the rear cargo area 12 when the tray 24 is in a deployed position or to support cargo when the tray is in the stowed position.

Figure 5:
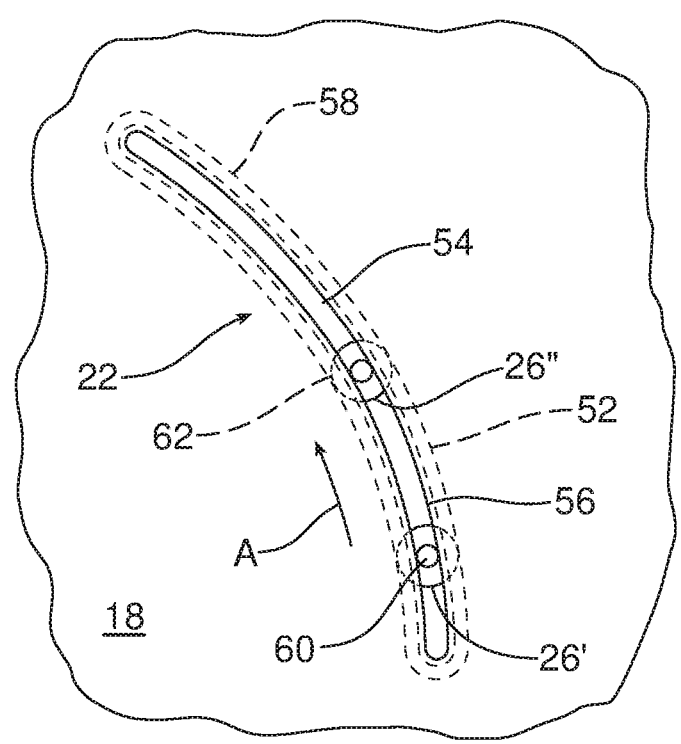
FIG. 5 is a partial side plan view of the guide track.

As shown in FIG. 5, the guide track 22 is formed in the side quarter panel 18. The second guide track 22 is similarly formed in side quarter panel 20 and will not be described herein. In the described embodiment, the guide tracks 22 are generally C-shaped channels 52 having a slot shaped opening 54 formed in the side quarter panel 18 for receiving the pegs 26, 28. The C-shaped channels 52 are integrally formed or molded with the side quarter panels 18 and 20 in the described embodiment. In alternate embodiments, however, the guide tracks 22 may include channels, C-shaped or otherwise, that are attached to the side quarter panels 18 and 20. The channels may be attached behind the side quarter panels 18 and 20 so as to be out of view or to a front of the side quarter panels.

The peg 26 extending from the side 30 of tray 24 extends through the slot shaped opening 54 which serves to guide the peg when the tray is moved between the stowed position 34 and deployed positions (e.g., the elevated position 38 or the intermediate position 36). As shown by action arrow A, the peg 26 moves along the slot shaped opening 54 from a first position wherein the peg is designated reference numeral 26' to a second position wherein the peg is designated reference numeral 26". As further shown, the guide track 22 includes a straight portion 56 and an arcuate portion 58. In other embodiments, the length of the straight and arcuate portions may vary, or the entire guide track may be arcuate or straight depending on the shape of the rear cargo area and design preferences.

As shown in FIGS. 2 and 5, the pegs 26, 28 in the described embodiment, are roller pegs. Each roller peg (e.g., peg 26) includes an axle 60 and a roller 62. The axle 60 is attached to the tray 24 and extends through the slot shaped opening 54. The roller 62 is retained by and in rolling engagement with the guide track 22. In perhaps a simplest alternate embodiment, the guide tracks 22 are slot shaped apertures molded into the side quarter panels and the pegs simply extend through the slot shaped apertures. The apertures contact and guide the pegs when the tray is moved between the stowed position and deployed positions.

Figure 6:
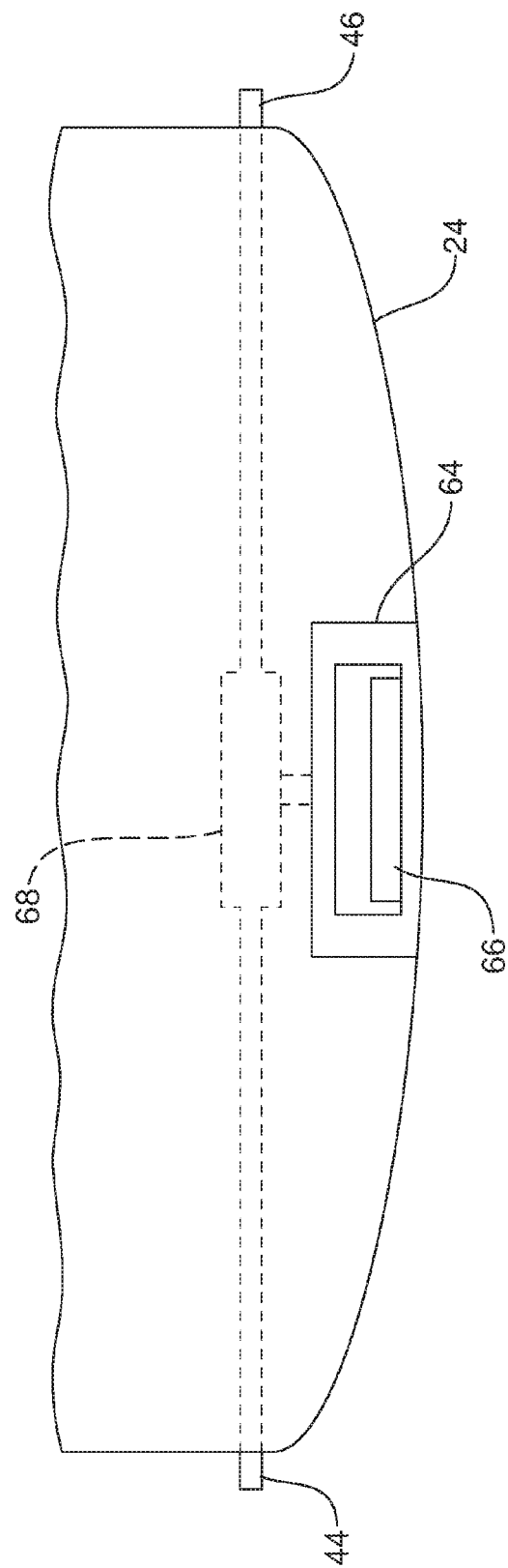
FIG. 6 is a partial top plan view of the tray showing an actuator and retention pins in an extended position.

As shown in FIG. 6, the tray 24 includes a handle 64. An actuator 66 forming a portion of the handle 64 activates a release mechanism 68. The release mechanism 68 is a type generally known in the art and is connected to the retention pins 44, 46. When the actuator 66 is in a normal position, the retention pins 44, 46 are extended as shown in FIG. 6 and engage and are supported by the receivers 48. When the handle 64 is grasped and the actuator 66 moved from a normal, extended position (shown in FIG. 6) to a retracted position (shown in FIG. 7), the release mechanism 68 operates to retract the retention pins 44, 46 from the extended position (shown in FIG. 6) to a retracted position (shown in FIG. 7). With the retention pins 44, 46 in the retracted position, the tray 24 may be moved between positions. Releasing the actuator 66 returns the actuator to its normal position and the retention pins 44, 46 to their extended position where they re-engage and are supported by the receivers 48.

In summary, numerous benefits result from the utilization of a tray designed to cover cargo positioned on a floor of a rear cargo area of a vehicle in a deployed position or to rest adjacent the floor in a stowed position. The tray is able to be stowed in the rear cargo area without being removed from its functional position. In other words, the tray remains engaged with guide tracks whether in the stowed or deployed positions. This allows for unfettered use of substantially the entire rear cargo area in the stowed position. Even more, the tray provides coverage of the cargo resting on the floor of the rear cargo area and may provide a second cargo area in the deployed position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle, comprising:
   a cargo area partially defined by a floor, a driver side quarter panel, and a passenger side quarter panel;
   guide tracks formed in said driver and passenger side quarter panels;
   a tray movable between a first position and a second position;
   a first roller extending from a driver side of said tray and engaging said driver side guide track and a second roller extending from a passenger side of said tray and engaging said passenger side guide track;
   a shelf extending from each of said driver side quarter panel and said passenger side quarter panel for supporting said tray in the second position.

2. The vehicle of claim 1, wherein said first position is adjacent said floor.

3. The vehicle of claim 2, wherein said tray is supported by said floor in the first position.

4. The vehicle of claim 1, wherein said guide tracks formed in said driver and passenger side quarter panels are channel shaped and said first and second rollers are retained within said guide tracks.

5. A vehicle having a cargo area partially defined by a floor, a driver side quarter panel, and a passenger side quarter panel, comprising:
   a first at least partially arcuate guide track formed in said driver side quarter panel;
   a second at least partially arcuate guide track formed in said passenger side quarter panel;
   a tray movable between a stowed position and at least one deployed position;
   a shelf extending from each of said driver side quarter panel and said passenger side quarter panel for supporting said tray in the at least one deployed position;
   a first peg extending from a driver side of said tray and engaging said first guide track and a second peg extending from a passenger side of said tray and engaging said second guide track;
   a first retention pin extending from said driver side of said tray for engaging said driver side quarter panel and a second retention pin extending from said passenger side of said tray for engaging said passenger side quarter panel; and
   a release mechanism for moving said first and second retention pins from an extended position to a retracted position to allow said tray to move.

6. The vehicle of claim 5, wherein said release mechanism includes an actuator and is connected to said first and second retention pins.

7. The vehicle of claim 5, further comprising a handle having an actuator linked to said release mechanism.

8. The vehicle of claim 5, wherein said tray has a cavity formed therein, said cavity accessible from an upper side of said tray.

9. The vehicle of claim 5, wherein said first guide track is a channel and said first peg is a roller retained by and in rolling engagement with said first guide track and said second guide track is a channel and said second peg is a roller retained by and in rolling engagement with said second guide track.

10. The vehicle of claim 9, wherein each of said channel in said first guide track and said channel in said second guide track include a straight portion and an arcuate portion.

11. A vehicle having a cargo area accessible through a lift gate opening frame and partially defined by a floor and driver and passenger side quarter panels, comprising:
    a guide track formed in each of the driver and passenger side quarter panels;
    a shelf extending into the cargo area from each of the driver and passenger side quarter panels;
    a tray movable between a stowed position adjacent said floor and at least one deployed position, said tray supported by said shelves in the at least one deployed position;
    first and second pegs extending from opposing sides of said tray and engaging said guide tracks;
    first and second retention pins extending from said opposing sides of said tray and engaging first and second receivers supported by said side quarter panels in the at least one deployed position; and
    a handle supported by said tray and connected to said retention pins for retracting said first and second retention pins from said first and second receivers.

12. The vehicle of claim 11, wherein said at least one deployed position includes an elevated position and an intermediate position between said elevated position and said stowed position.

13. The vehicle of claim 12, wherein said tray is substantially horizontal in the elevated position.

14. The vehicle of claim 12, wherein said tray is inclined in the intermediate position.

15. The vehicle of claim 11, wherein said first and second pegs are roller pegs.

16. The vehicle of claim 15, wherein said guide tracks are channel shaped and said roller pegs are retained within and in rolling engagement with said guide tracks.

17. The vehicle of claim 11, wherein said first and second receivers are apertures molded in said side quarter panels.

18. The vehicle of claim 11, wherein said first and second retention pins are extended when an actuator associated with said handle is in a normal position.

* * * * *